United States Patent
Kfir et al.

(10) Patent No.: US 12,405,984 B1
(45) Date of Patent: Sep. 2, 2025

(54) DYNAMIC AI TESTER WITH FEEDBACK-DRIVEN LEARNING

(71) Applicant: Check Point Software Technologies, Ltd., Tel Aviv (IL)

(72) Inventors: Barak Kfir, Givat-Shmuel (IL); Nofar Bardugo, Ramat-Gan (IL); Dan Eliezer Karpati, Even Yehuda (IL); Moisey Sidgiyayev, Holon (IL); Elena Root, Tel Aviv (IL); Yotam Ahrak, Beer Sheba (IL)

(73) Assignee: Check Point Software Technologies, Ltd., Tel Aviv (IL)

( * ) Notice: Subject to any disclaimer, the term of this patent is extended or adjusted under 35 U.S.C. 154(b) by 0 days.

(21) Appl. No.: 18/901,123

(22) Filed: Sep. 30, 2024

(51) Int. Cl.
*G06F 16/00* (2019.01)
*G06F 16/3349* (2025.01)

(52) U.S. Cl.
CPC .................. *G06F 16/3349* (2019.01)

(58) Field of Classification Search
CPC .................................. G06F 16/3349
See application file for complete search history.

(56) References Cited

U.S. PATENT DOCUMENTS

2024/0386362 A1* 11/2024 Piccolo ............. G06Q 10/1053

* cited by examiner

*Primary Examiner* — Ajith Jacob
(74) *Attorney, Agent, or Firm* — Renner, Otto, Boiselle & Sklar, LLP

(57) ABSTRACT

A device, method, and system are provided for improving user interactions with large language models (LLMs) by enhancing user queries. User queries are enhanced by retrieving if/then pairs from a database that are related to the user query. The query is matched to related if statements stored in the database and the then statements of the matched if statements are included with the query to generate improved answers from the LLM.

20 Claims, 5 Drawing Sheets

DYNAMIC AI TESTER WITH FEEDBACK-DRIVEN LEARNING

TECHNICAL FIELD

The present disclosure relates generally to large language models (LLMs) and more specifically to improving the output of LLMs using feedback driven learning.

BACKGROUND

Large Language Models (LLMs) are increasingly being used to assist administrators with managing corporate security by providing responses to natural language queries. However, LLMs are typically static and require substantial computational resources and time to update or fine-tune. This rigidity presents challenges in dynamic environments because improving the model based on user interactions and feedback is often cost prohibitive.

In multi-tenant systems, the challenge is compounded by the need to maintain tenant-specific data privacy and customization. Retraining or fine-tuning an LLM with data from one tenant is impractical for use with others due to confidentiality concerns. Consequently, enhancing the LLM's performance to cater to individual tenant needs without violating data privacy remains a significant hurdle.

SUMMARY

Few-shot learning may be used to improve large language model (LLM) responses without the need for retraining. By providing the LLM with relevant examples (few-shots) within the prompt, the model can generate better-tailored responses. However, identifying and selecting the most pertinent few-shot examples that align with a user's specific query and historical interactions is typically difficult.

The present disclosure provides a device, method, and system for improving user interactions with LLMs by enhancing user queries by including if/then statements retrieved from a database with the query.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
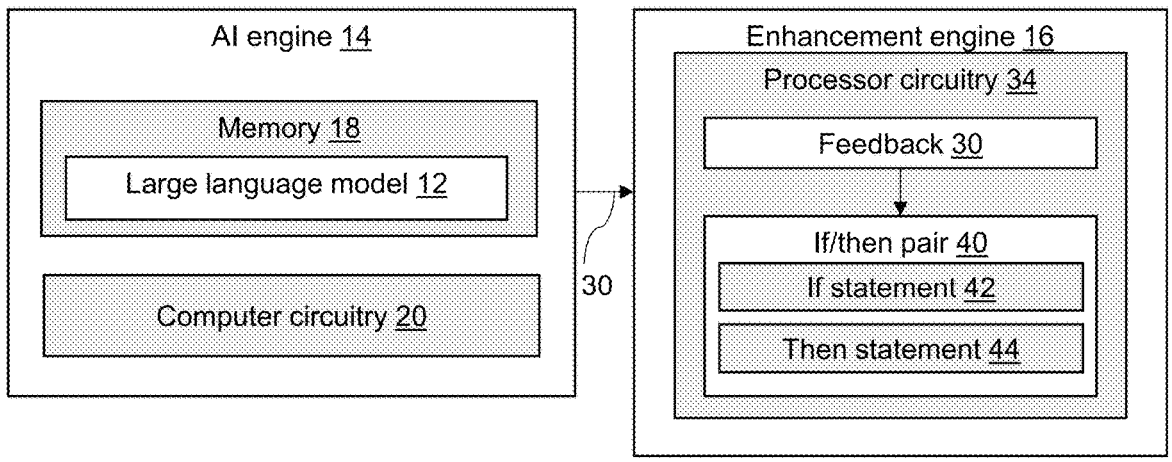
FIG. 1 is an exemplary diagram of a system for improving user interaction with a large language model (LLM) to manage corporate security.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a device, method, and system for improving user interactions with large language models (LLMs) by enhancing user queries. User queries are enhanced by retrieving if/then pairs from a database that are related to the user query. The query is matched to related if statements stored in the database and the then statements of the matched if statements are included with the query to generate improved answers from the LLM.

Turning to FIG. 1, a system 10 is shown for improving user interactions with a large language model (LLM) 12 to manage corporate security. The system 10 includes an AI engine 14 and an enhancement engine 16. The AI engine 14 stores the LLM 12 in memory 18 and includes computer circuitry 20 for interacting with users by responding to user queries.

Figure 2:
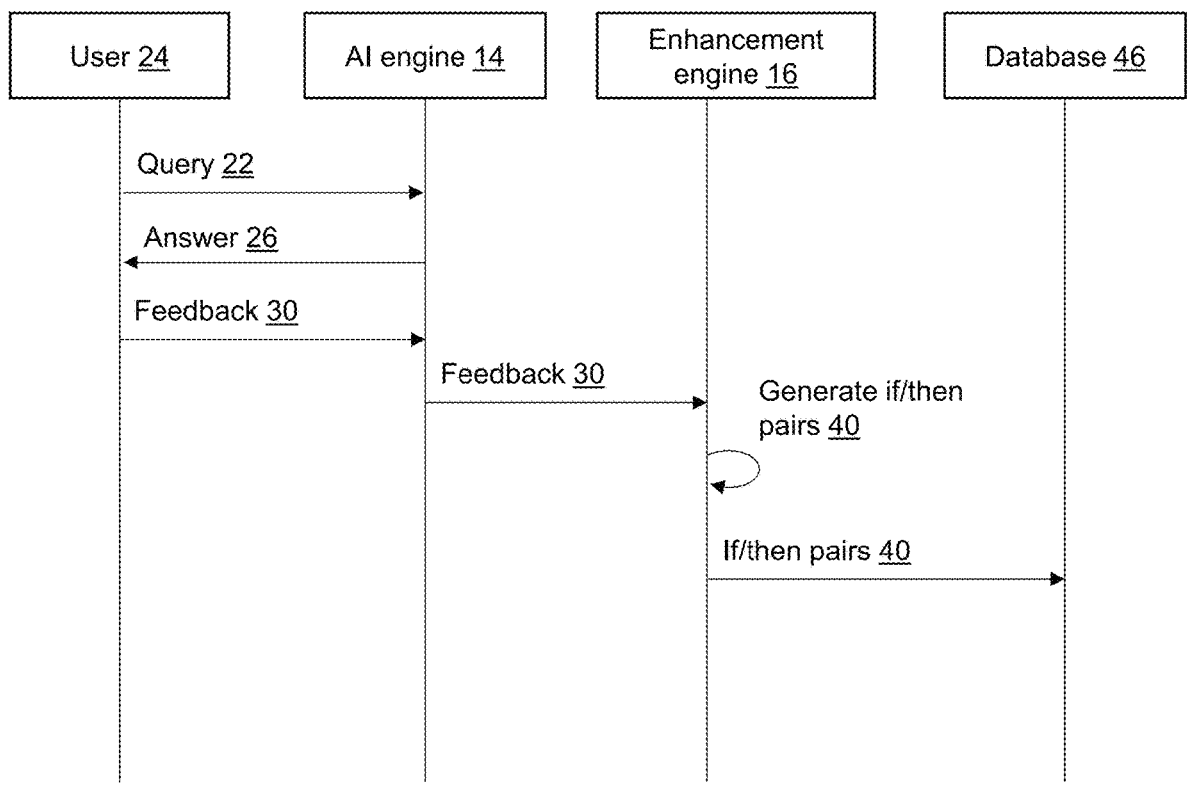
FIG. 2 is a ladder diagram showing generation and storage of if/then pairs in a database.

With exemplary reference to FIG. 2, the process of generating if/then pairs through responding user interaction is shown. When interacting with users, one or more queries 22 are received (e.g., sequentially) from a user 24. Each query 22 is processed with the LLM 12 via the AI engine 14 to generate an answer 26 to the query 22. The AI engine 14 provides the generated answer 26 to the user 24 and receives feedback 30 from the user 24 concerning the provided answer 26. The AI engine 14 outputs the received feedback 30 and the query 22 to the enhancement engine 16.

The query 22 and the answer 26 may together form a conversation. Each conversation may include more than one query 22 and responding answer 26. As an example, below is a conversation between a user and the LLM concerning DDOS attacks. In the below example, the question 22, answer 26, and feedback 30 are grouped together in a "Q-A" group (e.g., Q-A_1, Q-A_2, etc.).

"Conversation": {
  "Q-A_1": {
    "Question": "What is a DDOS attack?",
    "Answer": "A DDOS attack, or Distributed Denial of Service attack, is an attempt to make an online service unavailable by overwhelming it with traffic from multiple sources.",
    "Response Feedback": {
      "Scoring": "90%",
      "Expected Answer": "A DDOS attack stands for Distributed Denial of Service attack. It aims to make a system or network resource unavailable to its users by disrupting the services of a host connected to the Internet.",

```
    "What was done wrong": "Missed mentioning the
        disruption of services of a host.",
    "What could be done better": "Include that it disrupts
        the services of a host connected to the Internet."
    }
},
"Q-A_2": {
    "Question": "How can it be prevented?",
    "Answer": "DDOS attacks can be prevented by using a
        combination of traffic filtering, rate limiting, and
        employing cloud-based DDOS protection services.",
    "Response Feedback": {
        "Scoring": "95%",
        "Expected Answer": "DDOS prevention methods
            include traffic filtering, rate limiting, using spe-
            cialized firewalls, and leveraging cloud-based
            DDOS protection services.",
        "What was done wrong": "Didn't mention the use of
            specialized firewalls.",
        "What could be done better": "Include the mention
            of specialized firewalls in prevention methods."
    }
}
}
"Conversation Feedback": {
"Scoring": "Beneficial Conversation-Admin Goal
    Achieved",
"Comments": {"Accuracy":
    "Yes, the information was correct.",
    "Relevance": "Yes, the answer was relevant to the
        query.",
    "Completeness": "Yes, the answer covered all aspects
        of the query.",
    "Clarity": "Yes, the answer was easy to understand."
},
},
```

The feedback 30 indicates improvements or corrections for guiding answer generation by the AI engine 14. The feedback 30 identifies one or more quality aspects of the answer 26 including at least one of accuracy, relevance, completeness, and clarity. The feedback 30 may concern the individual answers and/or the conversation as a whole (i.e., the combination of the queries and answers). As shown in the above example, the feedback 30 may include multiple components. For example, the feedback 30 may include a score (e.g., 0-100%), an expected answer, and critiques (such as "What could be done better", "What was done wrong", etc.).

Feedback 30 may be received in various ways. After each question-answer interaction, users can rate the quality of the response and provide feedback on what was incorrect or could be improved. Additionally, at the end of a full conversation (i.e., after receiving the answer to the final question in the conversation), users may score the conversation based on how well it achieved their goals and leave comments about the accuracy, relevance, completeness, and clarity of the information. Furthermore, users qualified as domain experts can provide direct feedback through an expert feedback process, allowing them to critique responses and offer insights to enhance the LLM's knowledge.

With continued reference to FIG. 2, the enhancement engine 16 receives the query 22 and the feedback 30 from the AI engine 14 and may additionally receive the answer 26. Based on this input, the enhancement engine 16 generates at least one if/then pair 40, each consisting of an if statement 42 and a then statement 44. The enhancement engine 16 processes the feedback 30 to generate if/then pairs that improve the performance of the LLM 12, resulting in enhanced answers (described in further detail below).

To create each if/then pair 40, the enhancement engine 16 extracts a condition or scenario from the query 22 to form the if statement 42. The enhancement engine 16 then generates the then statement 44 from the feedback 30. These generated if/then pairs 40 are stored in a database 46, also referred to as the if/then database. The enhancement engine 16 may generate the then statement 44 by querying the LLM 12 or a different LLM using the received feedback 30.

Continuing the above example, exemplary if/then pairs 40 generated from the above conversation are provided below.

IF a user asks about a specific technical term (e.g., "DDOS attack"), THEN provide a concise yet comprehensive definition ensuring clarity.

IF a user poses a challenge or problem (e.g., mentioning a security threat), THEN proactively suggest potential solutions or preventive methods.

IF a response can benefit from data or information from the mentioned tools (e.g., Logs, API, CISGuide), THEN reference or pull relevant information from these tools in the answer.

IF a follow-up question is presented after a specific topic, THEN ensure the new answer relates contextually to the previous one.

IF feedback indicates a certain aspect of the response was lacking or incomplete, THEN delve deeper into the feedback and refine that specific aspect in future interactions.

IF an interaction involves an admin with a specific profile (e.g., a certain role or permission), THEN tailor the response to align with their expertise level and authority.

IF the conversation involves potential time-sensitive data or events, THEN refer to the 'Admin Time' to ensure provided information is current.

IF aiming to improve the quality of interactions and achieve a 'Beneficial Conversation' status, THEN ensure answers are accurate, relevant, comprehensive, and clear.

Figure 3:
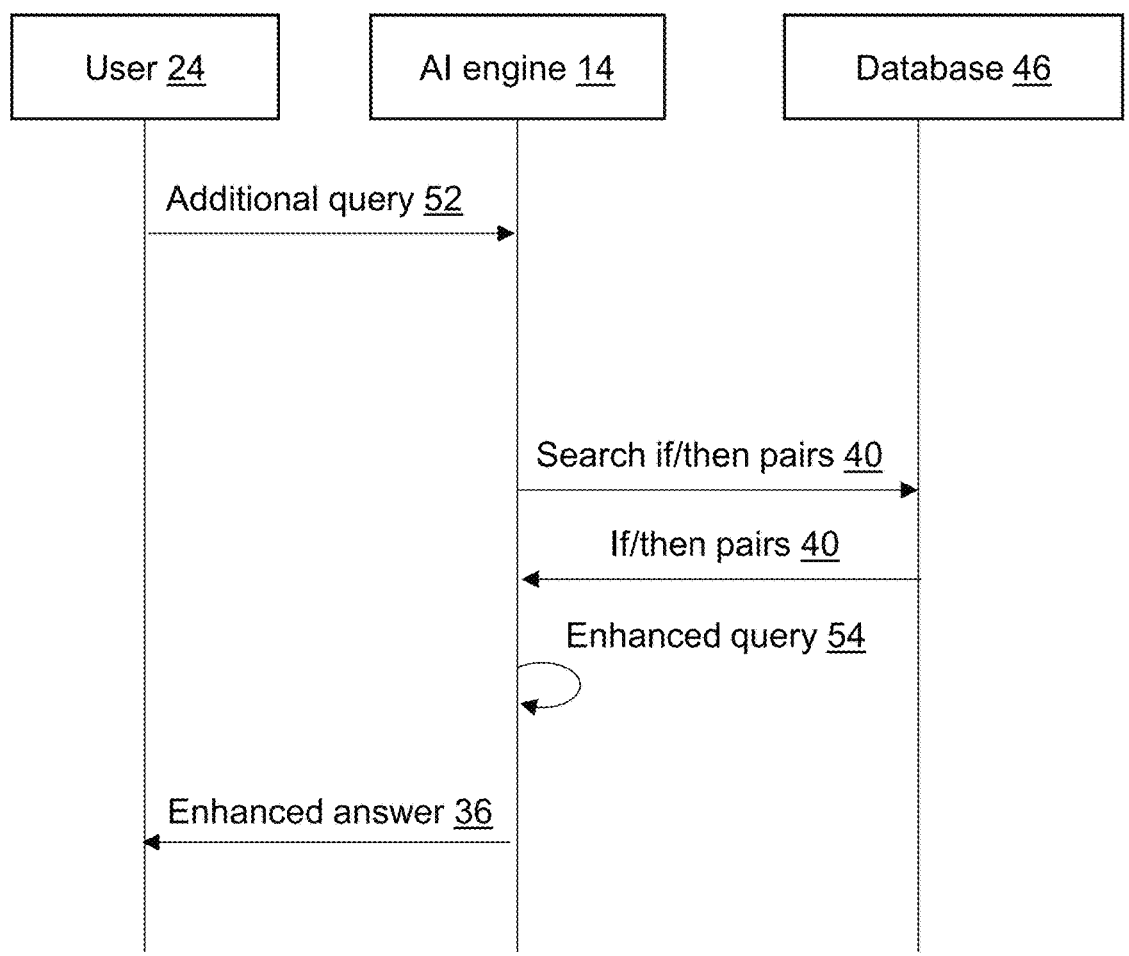
FIG. 3 is a ladder diagram showing generation of an enhanced answer using the stored if/then pairs.

With exemplary reference to FIG. 3, the computer circuitry 20 of the AI engine 14 generates an enhanced answer 50 for an additional query 52 received from the user 24. Upon receiving the additional query 52, the AI engine 14 retrieves related if/then pairs 40 from the database 46. The related if/then pairs 40 are identified by comparing the if statement of the stored if/then pairs 40 to the additional query 52.

Upon receiving the related if/then pairs 40 from the database 46, the AI engine 14 generates an enhanced query 54 by combining the additional query 52 with the then statements 44 of the retrieved if/then pairs 40. The AI engine 14 then processes the enhanced query 54 (e.g., a combination of the additional query 52 and the then statements 44 of the related if/then pairs 40) with the LLM 12 to generate an enhanced answer 50. The AI engine 14 provides the generated enhanced answer 50 to the user 24.

In one embodiment, retrieval of related if/then statements by the AI engine 14 may be improved by the enhancement engine 16 storing each of the if/then pairs 40 in the database 46 by vectorizing the if statement 42 of each if/then pair. That is, the if statement 42 of each pair 40 may be vectorized and the if/then pairs 40 may be stored using the vectorized if statement. For example, the database 46 may store the vectorized if statement 56 and the then statement without storing the original (non-vectorized) if statement 42.

The AI engine may retrieve the related if/then pairs 40 from the database 46 using a vector similarity search by vectorizing the additional query 52 to generate a vectorized query. The AI engine 14 may retrieve if/then pairs 40 stored in the database 46 having a vectorized if statement similar to the generated vectorized query. For example, the if/then pairs may be retrieved using Retrieval Augmented Generation (RAG).

RAG enhances the capabilities of LLMs by integrating an LLM with a retrieval system. That is, instead of relying solely on the information encoded within the LLM's parameters, RAG allows the model to access and incorporate relevant external data at the time of generating a response. When a user submits a query, the AI engine retrieves pertinent information from the if/then database 46 and includes this information directly in the prompt to the LLM 12. This augmentation provides the LLM 12 with context-specific guidance, enabling it to produce responses that are more accurate, relevant, and aligned with the user's needs.

Figure 4:
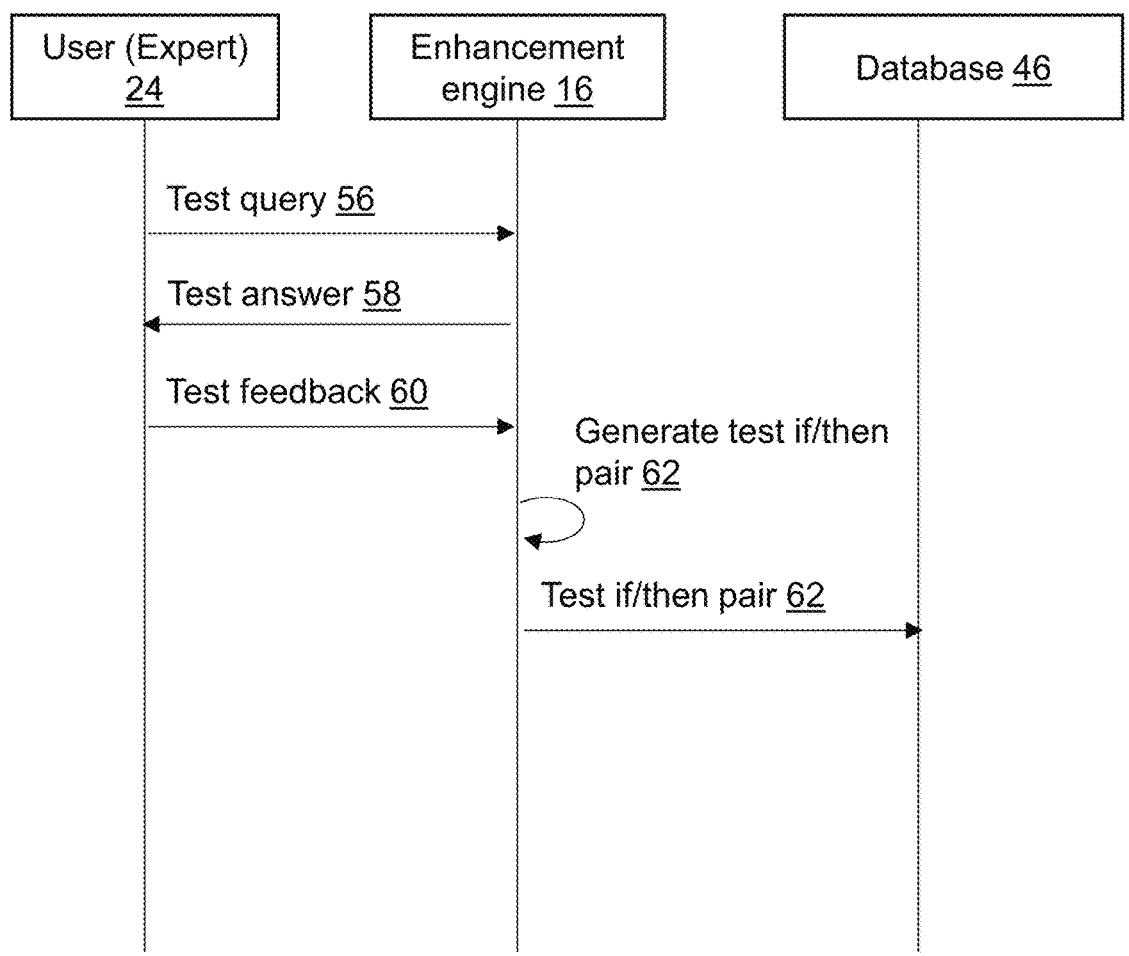
FIG. 4 is a ladder diagram showing an expert providing feedback to generate new if/then pairs.

With exemplary reference to FIG. 4, the system 10 may receive user feedback (e.g., from subject matter experts) to refine the LLM's decision-making algorithms. For example, the system 10 may enable expert users (also referred to as experts) to review the if/then pairs 40 stored in the database 46. To do so, the system 10 may retrieve if/then pairs stored in the database 46 and send the if/then pairs to an expert user. For example, the expert user may access the if/then pairs via a separate electronic device. The expert user's electronic device may receive the if/then pairs from the AI engine 14 or the enhancement engine 16. The expert user may correct (also referred to as edit) the if/then pairs 40 and provide the corrected if/then pairs. The corrected if/then pairs may then be used to update the if/then pairs stored in the database. For example, the AI engine 14 or the enhancement engine 16 may receive the corrected if/then pairs and update the if/then pairs stored in the database.

The enhancement engine may also automate the feedback loop by collecting feedback during testing and dynamically generating new if/then pairs in real-time for system improvement. For example, The enhancement engine 16 may conduct automated conversation tests. That is, the enhancement engine 16 may initiate a conversation test by sending a test query 56 to the AI engine 14. The AI engine 14 may use the LLM 12 to generate a test answer 58 to the test query. The enhancement engine 16 may analyze the received test answer 58 to generate test feedback 60 for the test answer 58. The enhancement engine 16 may use the test query 56, and the test feedback 60 to generate at least one test if/then pair 62. The enhancement engine 16 may then store each of the generated at least one test if/then pairs 62 in the database 46.

Figure 5:
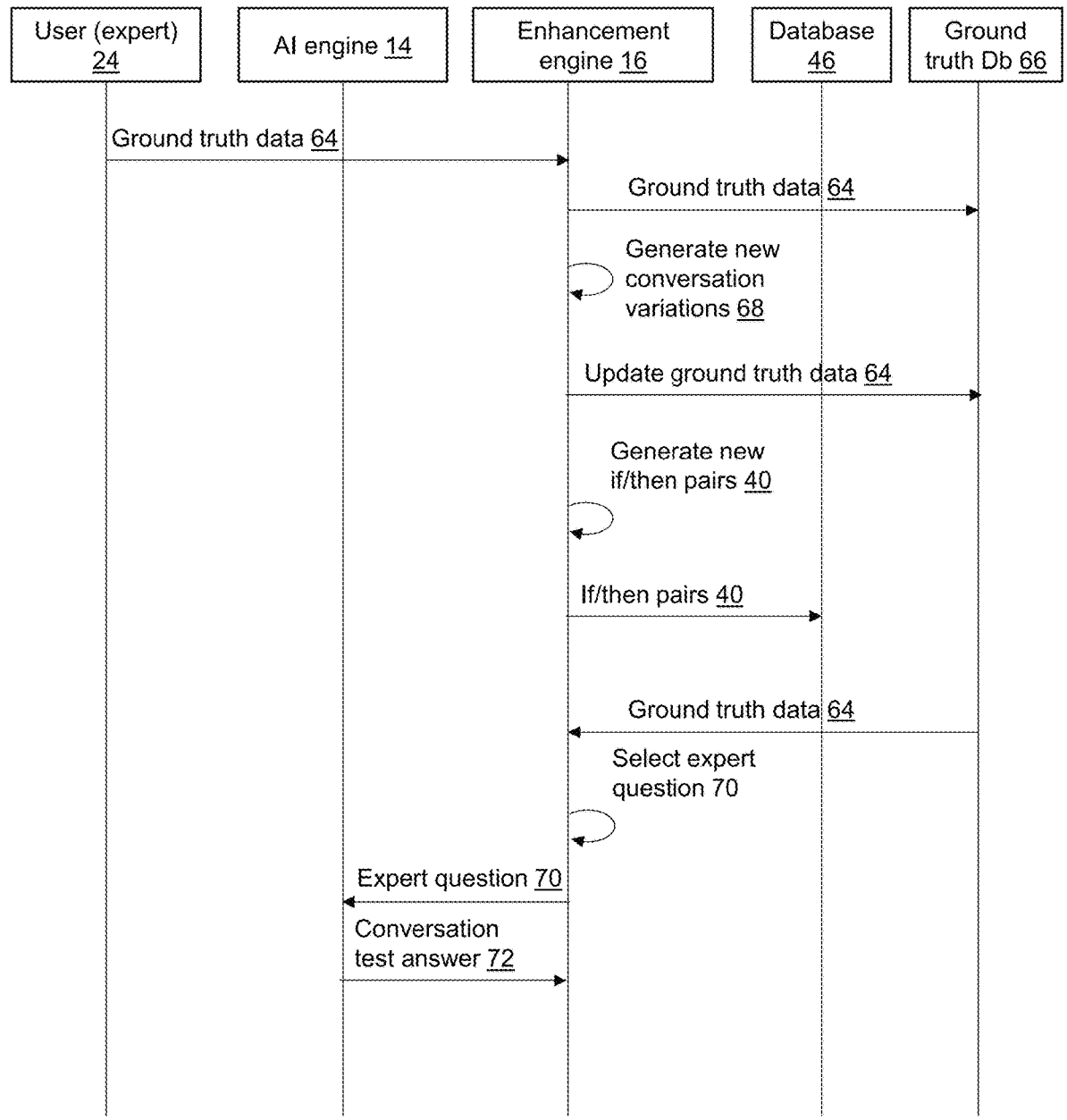
FIG. 5 is a ladder diagram showing an expert generating new ground truth data.

With exemplary reference to FIG. 5, the enhancement engine 16 may generate if/then pairs for ground truth data 64 received from an expert user. That is, the enhancement engine 16 may receive ground truth data 64 from an expert user. The ground truth data 64 may include a ground truth conversation including expert questions and expert answers (with each of the expert answers associated with one of the expert questions). The expert may provide the expert questions and expert answers. The expert user may be an administrator or any trusted individual knowledgeable in a subject area.

The enhancement engine 16 may store the ground truth data 64 in a ground truth database 66 and generate new conversation variations 68 from the received ground truth data comprising new ground truth questions and new ground truth answers. The enhancement engine 16 may then update the stored ground truth data 64 in the ground truth database 66 based on the generated new conversation variations 68.

The enhancement engine 16 may also generate new if/then pairs 70 from the ground truth data 64 and the new conversation variations 68. The new if/then pairs 70 may then be used to update the if/then pairs stored in the database 46. The system's 10 ability to dynamically generate new if/then pairs, allows the system 10 to continuously refine and improve its performance.

With continued reference to FIG. 5, the enhancement engine 16 may also retrieve the ground truth data 64 to perform a conversation test by looping through the retrieved ground truth data 64 until a predetermined condition is met. The ground truth data 64 includes expert questions 70 and corresponding expert answers that represent ideal interactions as defined by domain experts.

Before initiating the conversation test, the enhancement engine 16 processes the ground truth data 64 using a language model (such as the LLM 12 or a different LLM) to extract two key elements: (1) the admin goal, which represents what the administrator aims to achieve with the conversation, and (2) the expected result, which is the correct answer corresponding to the admin goal. The difference between the admin goal and the expected result may be that the admin goal focuses on the desired outcome (e.g., obtaining the IP address of a specific server), while the expected result is the actual answer or information needed to achieve that outcome.

Using these two elements, the enhancement engine 16 generates questions that guide the conversation toward achieving the admin goal. In each iteration of the conversation test, the enhancement engine 16 selects one of the expert questions 70 and calculates the next question to pose to the AI engine 14 by considering the admin goal and the expected result. The enhancement engine 16 then sends this generated question to the AI engine 14.

The AI engine 14 generates a conversation test answer 72 to the question using the LLM 12. The enhancement engine 16 compares the conversation test answer 72 to the expected result associated with the selected expert question 70. This comparison focuses on whether the conversation is progressing toward the admin goal, recognizing that the LLM's responses may vary in phrasing but should still lead in the same direction as the ground truth.

The enhancement engine 16 uses this comparison to determine whether the predetermined condition is met. The condition may be based on factors such as reaching the admin goal, exceeding a maximum number of iterations (e.g., ten loops), or satisfying other criteria that indicate the conversation has achieved the desired outcome or should be concluded.

After the condition has been met, the enhancement engine 16 generates a conversation evaluation score based on the comparison of the conversation test answers to the expected results (e.g., using the LLM). The enhancement engine 16 also generates conversation feedback that describes differences and similarities between the conversation test answers and the expert answers. This feedback may include assessments of how effectively the conversation advanced toward the admin goal, what aspects were handled well, and where improvements are needed. For example, the feedback may include a numerical score and more detailed human-like feedback using the LLM 12.

Using the generated conversation feedback, the enhancement engine 16 creates at least one conversation if/then pair from the expert questions 70 and the conversation feedback. For example, the enhancement engine 16 may generate an if/then pair where the "if" statement represents a condition or scenario encountered during the conversation test, and the "then" statement provides guidance or corrections based on the feedback. These if/then pairs help the system adapt to variations in the LLM's responses and improve future interactions.

The enhancement engine 16 stores each of the generated conversation if/then pairs in the if/then database 46. By incorporating these new if/then pairs into the database, the system enhances its ability to guide the LLM 12 in producing more accurate and goal-oriented responses in future conversations. This iterative process allows the system to test and improve itself using feedback generated from comparisons with ground truth data, without relying solely on human-provided feedback.

Access to the system 10 may be governed by role-based access control (RBAC), ensuring that users from one organization cannot access data from another organization, thereby maintaining privacy and organizational boundaries. The system 10 may enforce RBAC policies to restrict access to the if/then database 46 and other components, so that only authorized users within a tenant can access their own data and the generated if/then pairs associated with their organization.

To prevent data leakage across tenants, the enhancement engine 16 may employ scoping mechanisms when retrieving entries from the if/then database 46. Scoping filters out entries that are not relevant or permissible for a particular user or tenant. In some embodiments, the enhancement engine 16 uses search vectors with different vector representations to implement scoping, inherently limiting retrieval to data within the appropriate scope. This approach ensures that the system remains usable by all tenants without compromising data security, as improvements made for one tenant do not inadvertently affect or disclose information to other tenants. By utilizing scope, the system maintains data security and privacy for all users and tenants.

The LLM 12 may be based on any suitable language model adept at processing and interpreting natural language requests. For example, the LLM 12 may be trained on extensive datasets comprising diverse linguistic patterns and structures to equip the LLM 12 to recognize, understand, and respond to a wide array of natural language inputs with precision. The LLM 12 may be a general model or may be fine tuned to specific use cases.

The database may be any suitable data structure for storing and organizing conversation records and associated metadata. For example, the database may be a SQL or non-SQL database. Entries in the database may include tenant information, user IDs, user groups, and lists of questions and answers that were part of each conversation. Additionally, the database may store feedback provided by administrators, which consists of feedback per answer given by the administrator and overall conversation feedback also given by the administrator.

The computer circuitry 20 and processor circuitry 34 may have various implementations. For example, the computer circuitry 20 and processor circuitry 34 may include any suitable device, such as a processor (e.g., CPU, Graphics Processing Unit (GPU), Tensor Processing Unit (TPU), etc.), programmable circuit, integrated circuit, memory and I/O circuits, an application specific integrated circuit, microcontroller, complex programmable logic device, other programmable circuits, or the like. The computer circuitry 20 and processor circuitry 34 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the computer circuitry 20 and processor circuitry 34. The computer circuitry 20 and processor circuitry 34 may be communicatively coupled to the computer readable medium and a network interface through a system bus, motherboard, or using any other suitable structure known in the art.

The memory 18 (also referred to as computer readable medium) may be, for example, one or more of a buffer, a flash memory, a hard drive, a removable media, a volatile memory, a non-volatile memory, a random-access memory (RAM), or other suitable device. In a typical arrangement, the memory 18 may include a non-volatile memory for long term data storage and a volatile memory that functions as system memory for the computer circuitry 20 and processor circuitry 34. The memory 18 may exchange data with the processor circuitry over a data bus. Accompanying control lines and an address bus between the memory 18 and the processor circuitry also may be present. The memory 18 is considered a non-transitory computer readable medium.

The AI engine 14 and enhancement engine 16 may communicate with one another via any networked device capable of communication within a network infrastructure. Examples of such network devices include but are not limited to printers, Internet of Things (IoT) devices, routers, switches, access points, servers, printers, automobiles, security systems, thermostats and any other devices equipped with network interfaces. The network device may be connected through wired or wireless connections. It should be noted that the method is designed to be compatible with various network protocols and standards, such as Ethernet, Wi-Fi, Bluetooth, Zigbee, or cellular networks, allowing for flexible deployment in diverse networking environments.

The AI engine 14 and enhancement engine 16 may each be embodied as any suitable computer device. These computer devices may encompass a wide range of computing devices suitable for performing the disclosed functions and methods. This includes but is not limited to servers, desktop computers, network switches, routers, laptops, mobile devices, tablets, and any other computerized device capable of executing software instructions. The computer devices may include standard components such as a processor, memory, storage, input/output interfaces, and other necessary elements to execute the methods effectively. Furthermore, the computer device is not limited to a single device but may be embodied in a distributed computing environment. In such an environment, multiple interconnected devices may collaborate and work in unison to execute the computational steps of the methods and functions.

Figure 6:
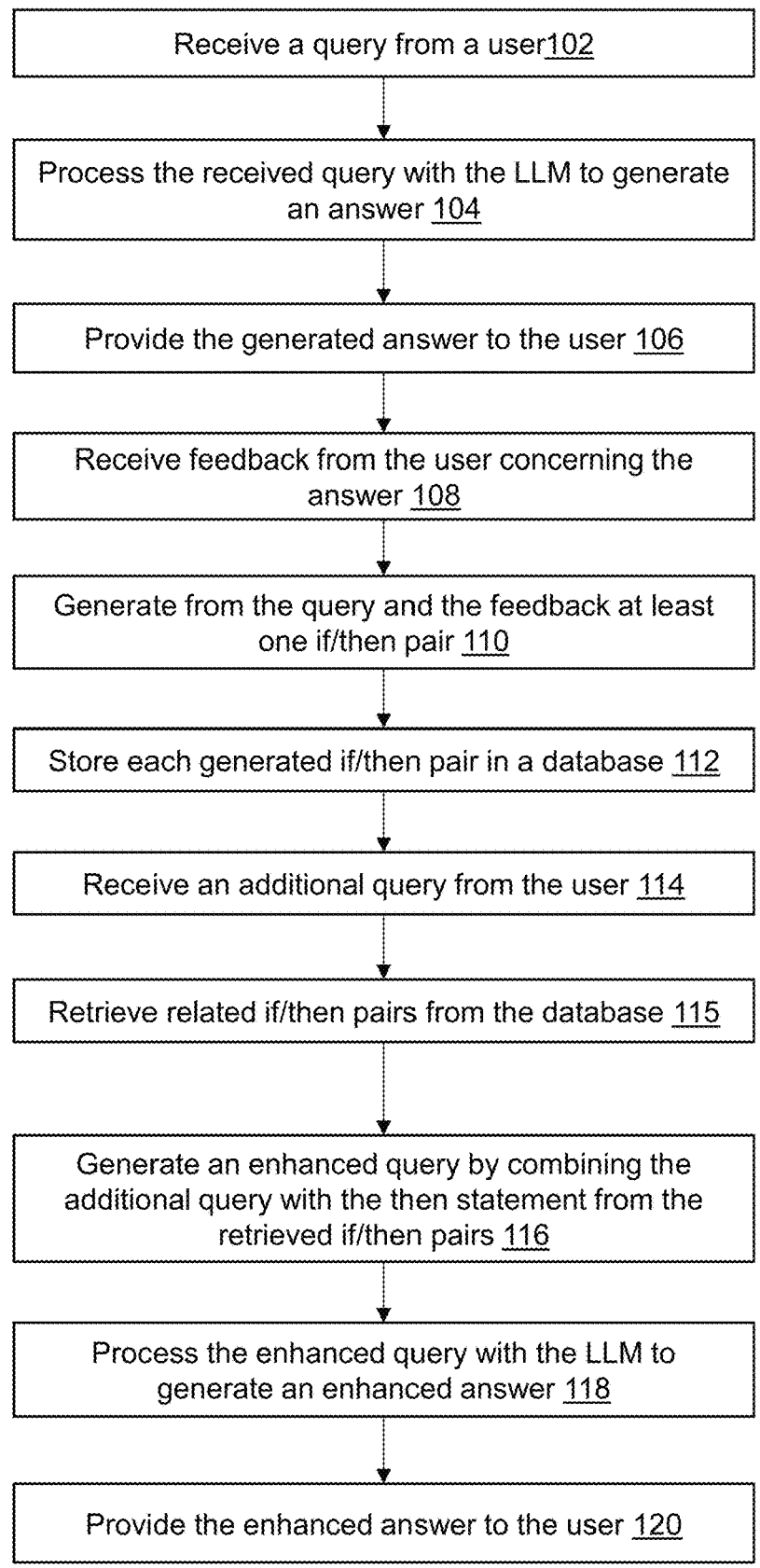
FIG. 6 is an exemplary flow diagram of a method for improving user interaction with a large language model (LLM) to manage corporate security.

Turning to FIG. 6, a method 100 is shown for improving user interaction with a large language model (LLM) executed by an AI engine to manage corporate security using an enhancement engine. The method 100 involves processor circuitry (also referred to as computer circuitry) executing the described steps.

In steps 102, 104, 106, 108, 110, and 112, a database of if/then pairs is generated by interacting with users by responding to user queries. In step 102, the AI engine receives a query from a user. In step 104, the AI engine processes the received query with the LLM to generate an answer to the query. In step 106, the generated answer is provided to the user. In step 108, the AI engine receives feedback from the user concerning the provided answer. The enhancement engine receives the query and the feedback from the AI engine and may also receive the answer.

In step 110, the enhancement engine generates from the received query and the received feedback at least one if/then pair. In step 112, each of the generated if/then pairs is stored in a database.

In steps 114, 116, 118, and 120, an enhanced answer is generated. In step 114, the AI engine receives an additional query from the user. In step 115, the AI engine retrieves from the database, as related if/then pairs, the stored if/then pairs having an if statement related to the received additional query. In step 116, the AI engine combines as an enhanced query the additional query with the then statements of the retrieved if/then pairs. In step 118, the AI engine processes the enhanced query with the LLM to generate an enhanced answer. In step 120, the generated enhanced answer is provided to the user.

The method 100 described herein may be performed using any suitable computerized device. For example, the method may be executed on a desktop computer, a laptop, a server, a mobile device, a tablet, or any other computing device capable of executing software instructions. The device may include a processor, memory, storage, input/output interfaces, and other standard components necessary for executing the method. The method 200 is designed to be platform-independent and can be implemented on various operating systems, such as Windows, macOS, Linux, or mobile operating systems like iOS and Android. Furthermore, the method may also be performed in a distributed computing environment, where multiple interconnected devices work collaboratively to execute the computational steps of the method.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A system for improving user interaction with a large language model (LLM) to manage corporate security comprising:
   an AI engine comprising:
      memory storing the LLM;
      computer circuitry configured to:
         interact with users by responding to user queries, wherein responding to each of the user queries comprises:
            receiving a query from a user;
            processing the received query with the LLM to generate an answer to the query;
            providing the generated answer to the user;
            receiving feedback from the user concerning the provided answer, wherein the feedback identifies one or more quality aspects of the answer including at least one of accuracy, relevance, completeness, and clarity; and
            outputting the received feedback and the query;
   an enhancement engine including processor circuitry configured to:
      receive the query and the feedback output by the AI engine;
      generate from the received query and the received feedback at least one if/then pair, wherein:
         each of the generated if/then pairs includes an if statement and a then statement; and
         each of the generated if/then pairs is generated by:
            extracting as the if statement a condition or scenario from the query; and
            generating from the feedback as the then statement a response indicating improvements or corrections for guiding answer generation by the AI engine; and
      store each of the generated at least one if/then pairs in a database;
   wherein the computer circuitry of the AI engine is further configured to:
      generate an enhanced answer by:
         receiving an additional query from the user;
         retrieving from the database, as related if/then pairs, the stored if/then pairs having an if statement related to the received additional query;
         combining as an enhanced query the additional query with the then statements of the retrieved if/then pairs;
         processing the enhanced query with the LLM to generate an enhanced answer; and
         providing the generated enhanced answer to the user.

2. The system of claim 1, wherein:
   the processor circuitry of the enhancement engine is further configured to store each of the at least one if/then pairs in the database by:
      vectorizing the if statement of the if/then pairs; and
      store each of the if/then pair using the vectorized if statement and the then statement; and
   the computer circuitry of the AI engine is further configured to retrieve from the database the related if/then pairs using a vector similarity search by:
      vectorizing the additional query to generate a vectorized query; and
      retrieving the if/then pairs stored in the database having a vectorized if statement similar to the generated vectorized query.

3. The system of claim 2, wherein the if/then pairs are retrieved using Retrieval Augmented Generation (RAG).

4. The system of claim 1, wherein the processor circuitry of the enhancement engine generates the then statement from the received feedback by querying the LLM to generate the then statement from the received feedback.

5. The system of claim 1, wherein the processor circuitry of the enhancement engine is further configured to perform expert review comprising:
   retrieving from the database the stored if/then pairs;
   sending the retrieved if/then pairs to an expert;
   receiving corrected if/then pairs from the expert; and updating the if/then pairs stored in the database based on the received corrected if/then pairs.

6. The system of claim 1, wherein the processor circuitry of the enhancement engine is further configured to:
   initiate a conversation test by sending a test query to the AI engine;
   receive from the AI engine as a test answer the generated answer to the test query;
   analyze the received test answer to generate test feedback for the test answer;
   generate from the test query and the generated test feedback at least one test if/then pair; and
   store each of the generated at least one test if/then pairs in the database.

7. The system of claim 1, wherein the processor circuitry of the enhancement engine is further configured to:
   receive ground truth data from an expert, wherein:
      the ground truth data comprises a ground truth conversation including expert questions and expert answers; and
      each of the expert answers is associated with one of the expert questions;
   store the ground truth data in a ground truth database;
   generate new conversation variations from the received ground truth data comprising new ground truth questions and new ground truth answers;
   update the stored ground truth data in the ground truth database based on the generated new conversation variations;
   generate new if/then pairs from the ground truth data and the new conversation variations; and
   update the if/then pairs stored in the database based on the generated new if/then pairs.

8. The system of claim 7, wherein the processor circuitry of the enhancement engine is additionally configured to:
   retrieve the ground truth data stored in the ground truth database;
   perform a conversation test by looping through retrieved ground truth data until a condition is met, wherein each loop of the conversation test includes:
      selecting one of the expert questions;
      sending the selected expert question to the AI engine;
      receiving from the AI engine as a conversation test answer the generated answer to the sent selected expert question;
      comparing the conversation test answer to the expert answer associated with the selected expert question; and
      determining whether the condition is met;
   generate a conversation evaluation score based on the comparison of the conversation test answer to the expert answer;
   generate conversation feedback based on the comparison of the conversation test answer to the expert answer, wherein the conversation feedback comprises differences and similarities between the conversation test answer and the expert answer;
   generate from the expert question and the generated conversation feedback at least one conversation if/then pair; and
   store each of the generated at least one conversation if/then pairs in the database.

9. An enhancement engine, for improving user interaction with an AI engine executing a large language model (LLM) to manage corporate security, comprising a computer device including processor circuitry configured to:
   generate a database of if/then pairs by:
      receiving a query input to the AI engine, and feedback received from a user concerning an answer generated by the AI engine in response to the received query;
      generating from the received query and the received feedback at least one if/then pair, wherein:
         each of the generated if/then pairs includes an if statement and a then statement; and
         each of the generated if/then pairs is generated by:
            extracting as the if statement a condition or scenario from the query; and
            generating from the feedback as the then statement a response indicating improvements or corrections for guiding answer generation by the AI engine; and
      store each of the generated at least one if/then pairs in a database; and
   generate an enhanced answer by:
      receiving an additional query from the user;
      retrieving from the database, as related if/then pairs, the stored if/then pairs having an if statement related to the received additional query;
      combining as an enhanced query the additional query with the then statements of the retrieved if/then pairs;
      processing the enhanced query with the LLM to generate an enhanced answer; and
      outputting the generated enhanced answer.

10. The enhancement engine of claim 9, wherein the processor circuitry is further configured to:
   store each of the at least one if/then pairs in the database by:
      vectorizing the if statement of the if/then pairs; and
      store each of the if/then pair using the vectorized if statement and the then statement; and
   retrieve from the database the related if/then pairs using a vector similarity search by:
      vectorizing the additional query to generate a vectorized query; and
      retrieving the if/then pairs stored in the database having a vectorized if statement similar to the generated vectorized query.

11. The enhancement engine of claim 10, wherein the if/then pairs are retrieved using Retrieval Augmented Generation (RAG).

12. The enhancement engine of claim 9, wherein the processor circuitry generates the then statement from the received feedback by querying the LLM to generate the then statement from the received feedback.

13. The enhancement engine of claim 9, wherein the processor circuitry is further configured to perform expert review comprising:
   retrieving from the database the stored if/then pairs;
   sending the retrieved if/then pairs to an expert;
   receiving corrected if/then pairs from the expert; and
   updating the if/then pairs stored in the database based on the received corrected if/then pairs.

14. The enhancement engine of claim 9, wherein the processor circuitry is further configured to:
   initiate a conversation test by sending a test query to the AI engine;
   receive from the AI engine as a test answer the generated answer to the test query;
   analyze the received test answer to generate test feedback for the test answer;
   generate from the test query and the generated test feedback at least one test if/then pair; and
   store each of the generated at least one test if/then pairs in the database.

15. The enhancement engine of claim 9, wherein the processor circuitry is further configured to:
receive ground truth data from an expert, wherein:
the ground truth data comprises a ground truth conversation including expert questions and expert answers; and
each of the expert answers is associated with one of the expert questions;
store the ground truth data in a ground truth database;
generate new conversation variations from the received ground truth data comprising new ground truth questions and new ground truth answers;
update the stored ground truth data in the ground truth database based on the generated new conversation variations;
generate new if/then pairs from the ground truth data and the new conversation variations; and
update the if/then pairs stored in the database based on the generated new if/then pairs.

16. The enhancement engine of claim 15, wherein the processor circuitry is additionally configured to:
retrieve the ground truth data stored in the ground truth database;
perform a conversation test by looping through retrieved ground truth data until a condition is met, wherein each loop of the conversation test includes:
selecting one of the expert questions;
sending the selected expert question to the AI engine;
receiving from the AI engine as a conversation test answer the generated answer to the sent selected expert question;
comparing the conversation test answer to the expert answer associated with the selected expert question; and
determining whether the condition is met;
generate a conversation evaluation score based on the comparison of the conversation test answer to the expert answer;
generate conversation feedback based on the comparison of the conversation test answer to the expert answer, wherein the conversation feedback comprises differences and similarities between the conversation test answer and the expert answer;
generate from the expert question and the generated conversation feedback at least one conversation if/then pair; and
store each of the generated at least one conversation if/then pairs in the database.

17. A method for improving user interaction with a large language model (LLM) executed by an AI engine to manage corporate security using an enhancement engine, the method comprising:
generating a database of if/then pairs by interacting with users by responding to user queries, wherein responding to each of the user queries comprises:
receiving with the AI engine a query from a user;
processing with the AI engine the received query with the LLM to generate an answer to the query;
providing the generated answer to the user;
receiving with the AI engine feedback from the user concerning the provided answer, wherein the feedback identifies one or more quality aspects of the answer including at least one of accuracy, relevance, completeness, and clarity; and
sending to the enhancement engine the received feedback and the query;
receiving with the enhancement engine the query and the feedback output by the AI engine;
the enhancement engine generating from the received query and the received feedback at least one if/then pair, wherein:
each of the generated if/then pairs includes an if statement and a then statement; and
each of the generated if/then pairs is generated by:
extracting as the if statement a condition or scenario from the query; and
generating from the feedback as the then statement a response indicating improvements or corrections for guiding answer generation by the AI engine; and
storing each of the generated at least one if/then pairs in a database;
generate an enhanced answer by:
receiving with the AI engine an additional query from the user;
the AI engine retrieving from the database, as related if/then pairs, the stored if/then pairs having an if statement related to the received additional query;
combining with the AI engine as an enhanced query the additional query with the then statements of the retrieved if/then pairs;
the AI engine processing the enhanced query with the LLM to generate an enhanced answer; and
providing the generated enhanced answer to the user.

18. The method of claim 17, further comprising performing an expert review comprising:
retrieving from the database the stored if/then pairs;
sending the retrieved if/then pairs to an expert;
receiving corrected if/then pairs from the expert; and
updating the if/then pairs stored in the database based on the received corrected if/then pairs.

19. The method of claim 17, further comprising:
initiating a conversation test with a feedback engine by sending a test query to the AI engine;
receiving the test query with the AI engine;
generating with the AI engine as a test answer an answer to the received test query;
sending the generated test answer to the feedback engine;
analyzing with the feedback engine the sent test answer to generate test feedback for the test answer;
generating with the feedback engine from the test query and the generated test feedback at least one test if/then pair; and
store each of the generated at least one test if/then pairs in the database.

20. The method of claim 17, further comprising:
receiving ground truth data from an expert, wherein:
the ground truth data comprises a ground truth conversation including expert questions and expert answers; and
each of the expert answers is associated with one of the expert questions;
storing the ground truth data in a ground truth database;
generating with a QA engine new conversation variations from the received ground truth data comprising new ground truth questions and new ground truth answers;
updating the stored ground truth data in the ground truth database based on the generated new conversation variations;
generating with the QA engine new if/then pairs from the ground truth data and the new conversation variations;
updating the if/then pairs stored in the database based on the generated new if/then pairs;

retrieving with the QA engine the ground truth data stored in the ground truth database;

performing a conversation test with the QA engine by looping through retrieved ground truth data until a condition is met, wherein each loop of the conversation test includes:

selecting one of the expert questions;

sending the selected expert question to the AI engine;

receiving from the AI engine as a conversation test answer the generated answer to the sent selected expert question;

comparing the conversation test answer to the expert answer associated with the selected expert question; and determining whether the condition is met;

generating with the QA engine a conversation evaluation score based on the comparison of the conversation test answer to the expert answer;

generating with the QA engine conversation feedback based on the comparison of the conversation test answer to the expert answer, wherein the conversation feedback comprises differences and similarities between the conversation test answer and the expert answer;

the QA engine generating from the expert question and the generated conversation feedback at least one conversation if/then pair; and storing each of the generated at least one conversation if/then pairs in the database.

* * * * *